United States Patent Office 3,139,391
Patented June 30, 1964

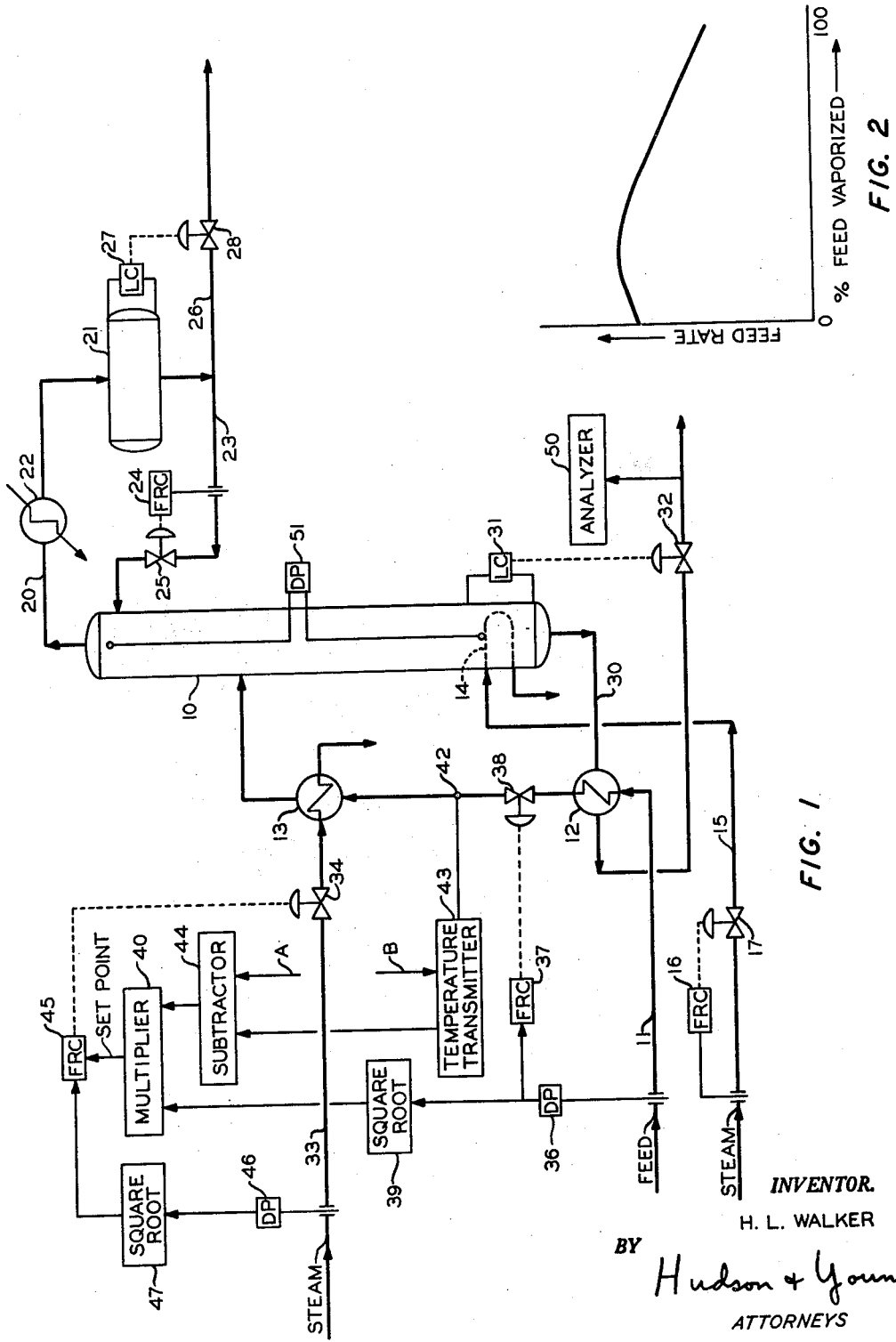

3,139,391
CONTROL PROCESS AND SYSTEM FOR FRACTIONAL DISTILLATION SYSTEMS
Harry L. Walker, Bartlesville, Okla., assignor to Phillips Petroleum Company, a corporation of Delaware
Filed Oct. 31, 1960, Ser. No. 66,174
9 Claims. (Cl. 202—40)

This invention relates to the control of fractionation columns to provide more efficient separation of fluid mixtures.

It is common practice in the chemical and petroleum industries to separate fluid mixtures by means of fractional distillation columns. These columns are provided with a number of vapor-liquid contacting means. The fluid mixture to be separated is introduced into an intermediate region of the column, and heat to vaporize liquid is supplied to the lower region of the column. A portion of the overhead vapors withdrawn from the column are condensed and returned to the column as reflux.

It has been discovered that fractionation processes of this type can be carried out with maximum efficiency when a preselected fraction of the feed mixture is introduced into the column in the vapor state. In particular, the capacity of the column generally exhibits a maximum for any particular feed mixture when some preselected fraction of the feed is vaporized prior to being introduced into the column. In accordance with the present invention, a method is provided for determining the fraction of the feed mixture which should be vaporized for any desired separation. Apparatus is provided for computing the amount of heat which must be added to the feed mixture in order to vaporize the selected fraction of the mixture. In response to this computation, the flow of a heating medium in heat exchange relationship with the feed stream is adjusted so as to vaporize the desired fraction of the feed mixture.

Accordingly, it is an object of this invention to provide control systems for fractionation columns which regulate the amount of heat supplied to the feed mixture so as to vaporize a preselected fraction of the feed mixture prior to entry into the fractionation column.

Another object is to provide a method for determining the fraction of the feed mixture to a fractionation column which should be vaporized to maintain the column capacity at a maximum.

Other objects, advantages and features of the invention should become apparent from the following detailed description, taken in conjunction with the accompanying drawing in which:

FIGURE 1 is a schematic representation of the control system of this invention.
FIGURE 2 is a graphical representation of the operation of the control system of this invention.

Referring now to the drawing in detail and to FIGURE 1 in particular, there is shown a conventional fractionation column 10. A feed mixture to be separated is introduced into column 10 through a conduit 11 which has heat exchangers 12 and 13 therein. Heat is supplied to the lower region of column 10 by circulation of steam or other heating medium through a reboiler coil 14. This steam is introduced into coil 14 by means of a conduit 15 at a constant rate which is maintained by a flow recorder-controller 16 that adjusts a valve 17. Vapors are removed from the top of column 10 through a conduit 20 which communicates with an accumulator 21 through a condenser 22. A portion of the resulting condensate in accumulator 21 is returned to the column as reflux through a conduit 23. The flow of reflux through conduit 23 is maintained at a predetermined rate by means of a flow recorder-controller 24 which adjusts a valve 25. The remainder of the condensate in accumulator 21 is removed as the overhead product stream through a conduit 26. The flow through conduit 26 is regulated by a liquid level controller 27 which adjusts a valve 28 to maintain a predetermined level in accumulator 21. The kettle product stream is removed through a conduit 30 which communicates with heat exchanger 12. The flow of kettle product is regulated by a liquid level controller 31 which adjusts a valve 32 to maintain a predetermined liquid level in the bottom of column 10.

Steam or other heating medium is circulated through heat exchanger 13 from a conduit 33. The temperature of the feed mixture is thus increased by passing in heat exchange relationship with the kettle product in exchanger 12 and with steam in exchanger 13. In accordance with the present invention, the flow of steam through conduit 33 is regulated by means of a valve 34 so that sufficient heat is added to the feed mixture to vaporize a preselected fraction thereof. The rate at which steam which must be added to vaporize this fraction of the feed mixture is defined by the following equation:

$$S = \frac{F[C_p(T_{bp} - T_t) + aL_f]}{L_s}$$

where:
$F$ = feed rate
$C_p$ = specific heat of liquid feed
$T_{bp}$ = bubble point temperature of feed
$T_f$ = feed temperature
$a$ = fraction of feed to be vaporized
$L_f$ = latent heat of feed
$L_s$ = latent heat of steam A signal proportional to the square of the flow rate of feed is established by a differential pressure transducer 36 which is connected across an orifice in conduit 11. The output signal of differential pressure transducer 36 is applied to a flow recorder-controller 37 which adjusts a valve 38 to maintain a predetermined rate of flow through conduit 11. In addition, the output signal of differential pressure transducer 36 is applied through a square root computer 39 to the first input of a signal multiplier 40. The output signal from computer 39 is proportional to the rate of flow of feed F to column 10. A temperature transducer 42 is positioned in conduit 11 between heat exchangers 12 and 13. Transducer 42 is connected to a temperature transmitter 43 which provides an output signal representative of the feed temperature $T_f$ multiplied by a constant B. The output signal of temperature transmitter 43 is applied to the first input of a signal subtractor 44. The second input to subtractor 44 is a constant A. The output signal from subtractor 44, which is representative of the quantity $(A - BT_t)$, is applied to the second input of multiplier 40. The output product of multiplier 40 is applied to the set point of a flow recorder-controller 45 which regulates valve 34. Controller 45 responds to the output signal of a differential pressure transducer 46 which is applied through a square root computer 47.

The constant A which is applied to subtractor 44 is equal to the quantity:

$$\frac{L_s}{C_p T_{bp} + aL_f}$$

The numerator of this quantity represents the amount of heat required to increase the temperature of the feed from a reference temperature $T_0$ up to the bubble point of the feed $T_{bp}$ and to vaporize $a$ percent of the feed. The denominator is the heat of vaporization of the steam, so that the quantity A represents the amount of steam required to heat the feed up to the bubble point and to vaporize the selected fraction. The quantity $BT_f$ (output of transmitter 43) is equal to the quantity $$\frac{C_p T_f}{L_s}$$

which is equal to the amount of steam required to heat the feed mixture from $T_0$ to $T_f$. The quantity $A - BT_f$ is thus equal to the amount of steam required to heat the feed from $T_f$ to $T_{bp}$ and to vaporize $a$ percent thereof. The terms A and B are constants for any given feed composition and are set manually into the computer. The output signal of multiplier 40 is equal to the quantity:

$$F(A - BT_f)$$

which is equal to the amount of steam that must be added to the feed mixture to vaporize $a$ percent thereof.

It has been discovered that for any given fluid separation, there exists a fraction of feed mixture to be vaporized which results in a column being operated at maximum capacity. This quantity of feed mixture to be vaporized can be determined by operating the column with different amounts of feed vaporized to determine the corresponding maximum feed rates which can be employed without flooding the column. For any given feed composition, the amount of heat required to vaporize a preselected fraction of the feed can readily be computed. The steam flow through conduit 33 is then adjusted manually to vaporize selected fractions of the feed. For a first arbitrary amount of feed to be vaporized, the column operation is adjusted so that a preselected separation is made. This can be determined, for example, by analyzing one or both of the product streams to determine the composition of a constituent or constituents thereof. An analyzer 50 communicating with conduit 30 can be employed for this purpose. The feed rate is then increased until the column is nearly flooded. This condition of incipient flooding can be determined by means of a differential pressure indicator 51 which is connected between the top and bottom regions of the column. The differential pressure across the column increases abruptly immediately before the column is flooded. This incipient flooding condition can also be determined by providing the column with several windows to permit an operator to inspect the liquid levels on the trays in the column. The column becomes flooded when the liquid level rises above the top of one of the trays.

A curve of the type shown in FIGURE 2 can then be plotted for different percentages of the feed vaporized. The flow rates shown in FIGURE 2 are the rates of feed flow immediately before flooding occurs for the different percentages of feed vaporized. The maximum point in the resulting curve represents the percent of the feed which should be vaporized for maximum column capacity. Appropriate constants are then set into the computer to vaporize this percentage of the feed prior to entry into the column.

As a specific example of the operation of the control system of this invention reference is made to a deethanizer employed in a natural gasoline plant. The column had an inside diameter of 6 feet and contained 30 bubble cap trays spaced 27 inches apart. Typical compositions and flow rates were as follows:

| Component | Flows (gal./day) | | |
|---|---|---|---|
| | Feed | Overhead Product | Kettle Product |
| Carbon dioxide | 1,211 | 1,211 | |
| Hydrogen sulfide | 8,416 | 6,960 | 1,456 |
| Methane | 16,090 | 16,090 | |
| Ethane | 86,293 | 82,093 | 4,200 |
| Propane | 215,705 | 61,465 | 154,240 |
| Isobutane | 33,688 | 1,109 | 32,579 |
| Normal butane | 113,255 | 1,382 | 111,873 |
| Isopentane | 34,412 | 188 | 34,224 |
| Normal pentane | 43,897 | 102 | 43,795 |
| Hexanes | 46,119 | | 46,119 |
| Heptanes + | 27,984 | | 27,984 |

The pressures in the top and bottom of the column were 424 and 427 p.s.i.g., respectively. The temperatures at the top and bottom of the column were 121° F. and 240° F., respectively. The reflux to feed ratio was 0.4/1.

The criterion for satisfactory operation of this column was maintaining approximately one mol percent ethane in the kettle product. It was found that a maximum feed rate of 684,000 gal./day could be processed when 17.3 percent of the feed was vaporized. Approximately 86.5 percent of this maximum feed could be passed through the column when none of the feed was vaporized whereas only 46 percent of the maximum feed could be passed through the column when all of the feed was vaporized. This relationship is illustrated in FIGURE 2.

In view of the foregoing description, it can be seen that an improved fractionation control system is provided by this invention. While the invention has been described in conjunction with a present preferred embodiment, it should be evident that it is not limited thereto.

What is claimed is:

1. In a fluid mixture separation system wherein a liquid mixture to be separated is heated in a heat exchanger to partially vaporize the same and the resulting heated mixture is introduced as feed into a fractionation column, a first product stream is removed from an upper region of said column; and a second product stream is removed from a lower region of said column; control apparatus comprising means to establish a first signal representative of the rate of flow of said liquid mixture, means to establish a second signal representative of the temperature of said liquid mixture prior to the heating thereof in said heat exchanger, means responsive to said first and second signals to establish a third signal representative of the amount of heat required to vaporize a preselected fraction of said liquid mixture, and means responsive to said third signal to add said amount of heat to said liquid mixture in said heat exchanger.

2. In a fluid mixture separation system wherein a liquid mixture to be separated is heated in a heat exchanger with a heat exchange medium to partially vaporize said liquid mixture and the resulting partially vaporized mixture is introduced as feed into a fractionation column, a first product stream is removed from an upper region of said column, and a second product stream is removed from a lower region of said column; control apparatus comprising means to establish a first signal representative of the rate of flow of said liquid mixture, means to establish a second signal representative of the temperature of said liquid mixture prior to the heating thereof in said heat exchanger, means to multiply said second signal by a first constant to establish a third signal, said first constant being the ratio of the specific heat of said liquid mixture to the latent heat of said heat exchange medium, means to subtract said third signal from a second constant to establish a fourth signal, said second constant being the amount of said heat exchange medium required to heat said liquid mixture up to the bubble point thereof and to vaporize a preselected fraction of said liquid mixture, means to multiply said first signal by said fourth signal to establish a fifth signal, and means responsive to said fifth signal to control the amount of said heat exchange medium used to heat said liquid mixture in said heat exchanger.

3. In a fluid mixture separation system wherein a liquid mixture to be separated is heated by indirect heat exchange with steam in a heat exchanger to partially vaporize said liquid mixture and the resulting partially vaporized mixture is introduced as feed into a fractionation column, a first product stream is removed from an upper region of said column, and a second product stream is removed from a lower region of said column; control apparatus comprising means to establish a first signal F representative of the rate of flow of said liquid mixture, means to establish a second signal $T_f$ representative of the temperature of said liquid mixture prior to the heating thereof in said heat exchanger, a computer means adapted to provide an output signal S representative of the quality:

$$\frac{F[C_p(T_{bp}-T_f)+aL_f]}{L_s}$$

where $C_p$ is a first constant representative of the specific heat of said liquid mixture, $T_{bp}$ is a second constant representative of the bubble point temperature of said liquid mixture, $a$ is a third constant representative of a preselected fraction of said liquid mixture to be vaporized, $L_f$ is a fourth constant representative of the latent heat of said liquid mixture, and $L_s$ is a fifth constant representative of the latent heat of steam, means to transmit signals representative of said constants to said computer means, means to transmit said first and second signals to said computer means, and means responsive to said output signal S to pass a quantity of steam representative thereof in heat exchange relationship in said heat exchanger with said liquid mixture.

4. A fluid separation system comprising a fractionation column, a heat exchanger for heating a liquid mixture to partially vaporize the same, first conduit means communicating with said column through said heat exchanger to introduce as feed the resulting partially vaporized mixture to said column, second conduit means communicating with an upper region of said column to withdraw vapors, third conduit means communicating with a lower region of said column, means communicating with said first conduit means at a point upstream of said heat exchanger to establish a first signal representative of the flow of said liquid mixture through said first conduit means, means communicating with said first conduit means upstream of said heat exchanger to establish a second signal representative of the temperature of said liquid mixture in said first conduit means, fourth conduit means communicating with said heat exchanger to supply the same with a heat exchange medium, means responsive to said first and second signals to establish a third signal representative of the amount of heat required to vaporize a preselected fraction of said liquid mixture, and means responsive to said third signal to control the rate of flow of said heat exchange medium through said fourth conduit means to maintain the vaporization of said preselected fraction of said liquid mixture.

5. A fluid separation system comprising a fractionation column, a first heat exchanger to heat a liquid mixture, a second heat exchanger to heat the resulting heated liquid mixture and partially vaporize the same, first conduit means to pass said heated liquid mixture from said first heat exchanger to said second heat exchanger and thence to pass the partially vaporized mixture from the latter exchanger as feed to said column, second conduit means communicating with an upper region of said column to withdraw vapors, third conduit means extended from a lower region of said column to withdraw liquid therefrom and pass it to said first heat exchanger where it is employed as a heat exchange medium, means communicating with said first conduit means to establish a first signal representative of the flow of said liquid mixture therethrough, means communicating with said first conduit means between said heat exchangers to establish a second signal representative of the temperature of said resulting heated liquid mixture in said first conduit means, fourth conduit means communicating with said second heat exchanger to supply the same with a heat exchange medium, means responsive to said first and second signals to establish a third signal representative of the amount of heat required to vaporize a preselected fraction of said liquid mixture, and means responsive to said third signal to control the rate of flow of the heat exchange medium through said fourth conduit means.

6. In a process for the separation of a liquid mixture, wherein said liquid mixture is heated and partially vaporized by heat exchanging it with a heat exchange medium, and the resulting partially vaporized mixture is introduced as feed into a fractionation column, the improvement comprising measuring the rate of flow of said liquid mixture and the temperature thereof prior to the heating thereof with said heat exchange medium and producing respectively first and second signals representative of said measurements, combining said signals to produce a third signal proportional to the amount of heat required to vaporize a preselected fraction of said liquid mixture, and controlling the heating of said liquid mixture with said heat exchange medium responsive to said third signal to ensure the vaporization of said preselected fraction of said liquid mixture.

7. In a process for the separation of a liquid mixture, wherein said liquid mixture is heated and partially vaporized by heat exchanging it with a heat exchange medium, and the resulting partially vaporized mixture is introduced as feed into a fractionation column, the improvement comprising measuring the rate of flow of said liquid mixture and producing a first signal representative of the measured rate of flow, measuring the temperature of said liquid mixture prior to the heating thereof with said heat exchange medium to produce a second signal representative of the amount of said heat exchange medium required to heat said liquid mixture from its ambient temperature to its bubble point temperature and to vaporize a preselected fraction thereof, multiplying said first and second signals and producing a resulting product signal representative of the amount of said heat exchange medium required to be heat exchanged with said liquid mixture in said heating step to vaporize said preselected fraction of said liquid mixture, and controlling said heating of said liquid mixture in accordance with said product signal to ensure the vaporization of said preselected fraction of said liquid mixture.

8. In a process for the separation of a liquid mixture, wherein said liquid mixture is heated and partially vaporized by heat exchanging it with a heat exchange medium, and the resulting partially vaporized fluid mixture is introduced as feed into a fractionation column, the improvement comprising measuring the rate of flow of said liquid mixture and producing a signal F representative of the measured rate of flow, measuring the temperature of said liquid mixture prior to the heating thereof in the said heat exchange medium and producing a signal $T_f$ representative of the measured temperature, producing a signal A representative of the amount of heat required to increase the temperature of said liquid mixture up to the bubble point temperature of said liquid mixture and to vaporize a preselected fraction of said liquid mixture, producing a signal B representative of the ratio of the specific heat of said liquid fluid mixture in the liquid state to the latent heat of said heat exchanged medium, combining said signals according to the equation:

$$S=F(A-BT_f)$$

to produce a signal S representative of the amount of said heat exchange medium required to be heat exchanged with said liquid mixture in said heating step to vaporize said preselected fraction of said liquid mixture, and controlling the heating of said liquid mixture responsive to said signal S to ensure the vaporization of said preselected fraction of said liquid mixture.

9. The process according to claim 8 wherein said heat exchange medium is steam.

References Cited in the file of this patent

UNITED STATES PATENTS

| | | |
|---|---|---|
| 2,508,434 | Storment | May 23, 1950 |
| 2,509,136 | Cornell | May 23, 1950 |
| 2,900,312 | Gilmore | Aug. 18, 1959 |
| 2,933,900 | Hanthorn | Apr. 26, 1960 |
| 2,976,234 | Webber | Mar. 21, 1961 |
| 2,992,976 | Cottle | July 18, 1961 |
| 3,020,213 | Lupfer | Feb. 6, 1962 |

FOREIGN PATENTS

| | | |
|---|---|---|
| 859,153 | Germany | Apr. 10, 1952 |
| 1,177,743 | France | Dec. 8, 1958 |